Figure 4:
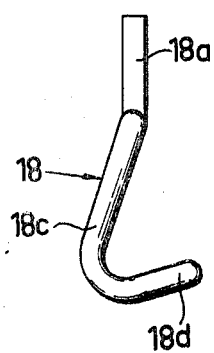

United States Patent
Hyppölä

[15] 3,651,768
[45] Mar. 28, 1972

[54] METHOD FOR SEPARATING WET GLUTEN OR GLUTENIN FROM FLOUR

[72] Inventor: Kalervo Onni Hyppölä, Helsinki, Finland
[73] Assignee: Falling Number AB, Stockholm, Sweden
[22] Filed: Apr. 6, 1970
[21] Appl. No.: 25,880

[30] Foreign Application Priority Data

Apr. 8, 1969 Finland..................................1008/69

[52] U.S. Cl..............................................99/94, 259/108
[51] Int. Cl..........................................................A21c 1/06
[58] Field of Search......................107/38, 36, 30, 54 B, 54 D, 107/53, 4 A, 4 R; 259/106, 107, 108; 127/14, 15, 21, 19, 56; 34/58; 99/93

[56] References Cited

UNITED STATES PATENTS 2,791,405  5/1957  Liston ..................................107/54 B
1,970,551  8/1934  Berge..................................127/19 X Primary Examiner—James R. Boler
Attorney—Albert M. Parker

[57] ABSTRACT

The invention relates to a method and an apparatus for separating wet gluten or glutenin from a dough of flour and water by kneading the dough and washing it by water so as to remove water-soluble constituents in the dough, the dough preparing step, the kneading and washing steps all being performed by means of agitating or stirring means in succession in one and the same vessel in such a manner that the speed of agitation or stirring is considerably higher during the dough preparing step than during the kneading and washing steps.

5 Claims, 5 Drawing Figures

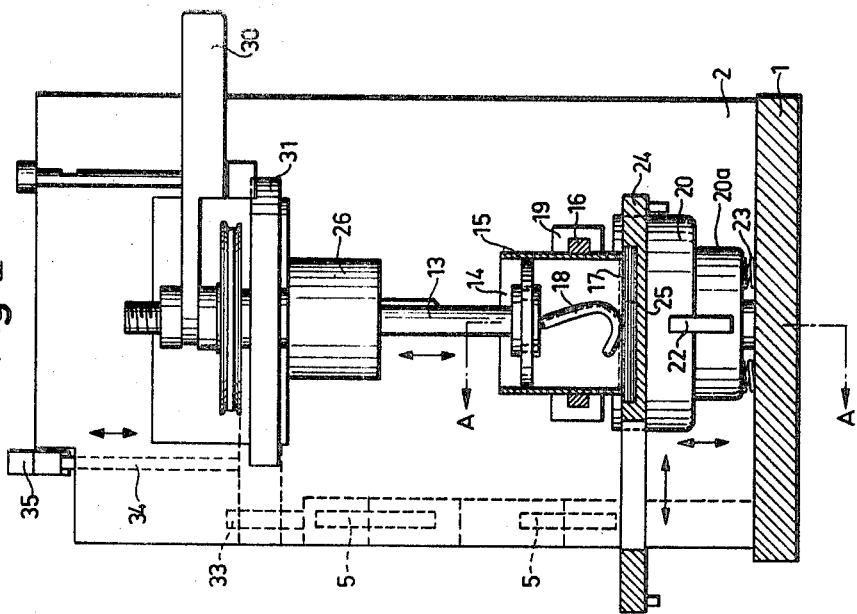

METHOD FOR SEPARATING WET GLUTEN OR GLUTENIN FROM FLOUR

The baking properties of wheat are in direct relation to its content of gluten or glutenin. It has been found that the correlation between the protein content of wheat and its content of wet gluten or glutenin is over 0.90. Thus, the quantity of wet glutenin is also a gauge of the protein content of the wheat. When only an approximate value is required it is sufficient to determine the percentage of wet glutenin instead of using complicated methods to determine the protein content.

According to a known, generally used method the wet glutenin content is determined in the following way:

Predetermined quantities of flour and water, for example 10 g, flour and 6 ml. water, are mixed to a dough. The dough is kneaded manually and is then left to stand for 30 minutes. The ball of dough is then rolled with the fingers on a flat filter cloth while adding water to the ball. In this way constituents other than glutenin will gradually be washed out of the dough. Water is removed from the remaining glutenin by rolling the latter between glass sheets until the glutenin body has acquired a certain degree of dryness. This can only be estimated subjectively, however. The remainder consists of so-called wet glutenin. It comprises an elastic substance, similar to chewing gum, which does not stick to a wet surface.

It is also known to provide washing means having a function corresponding to that now described. In this means the ball of dough is rolled onto a horizontal filter cloth with the help of a convex metal plate, while adding water to the ball. However, the means has poor capacity for series tests on grain. This disadvantage can be rectified by arranging several separate rolling units in the same device. However, this means increased costs and the treating time for carrying out a test is not decreased. A total time exceeding 40 minutes (5 – 6 minutes being the necessary manual operating time) when using the above-mentioned arrangement is a considerable deterrent for the use of this method, for example for evaluating grain deliveries upon receipt.

The present invention aims at avoiding the above-mentioned disadvantages during separation of wet glutenin in flour when testing such flour. Due to the invention this test can be carried out in a time which is only a fraction of that previously required. No manual work, with the consequent waste of time, is required for the mixing, kneading and washing of the substance and for removing the water.

One object of the present invention is to provide a method for separating wet gluten or glutenin from flour suitable for baking, particularly flour produced from wheat, by mixing predetermined quantities of flour and water to a dough which is kneaded and from which water-soluble constituents are washed away with water, and subsequently the water and the substance dissolved therein are removed from the dough so that wet glutenin will be obtained ready for weighing.

The method of separating wet gluten or glutenin from flour intended for baking purposes, particularly flour produced from wheat, according to the invention, comprises the steps of mixing predetermined quantities of flour and water to a dough, kneading the dough, washing away water-soluble constituents from the dough with water, and then removing water and substances dissolved or dispersed therein from the dough so as to obtain wet gluten or glutenin. The method according to the invention is substantially characterized by the step of carrying out the phases of the mixing, kneading and washing processes successively in one and the same vessel, and mechanically mixing and kneading the constituents during these phases at a stirring speed which, with a view to effecting rapid mixing, is considerably higher during said mixing phase than during said kneading and washing phases, so as to prevent the glutenin constituents from leaving the vessel during the last two phases.

A further object of the invention is to provide an apparatus for carrying out said method. This apparatus is substantially characterized by a common vessel for mixing, kneading and washing the dough, said vessel comprising a sieve section for removing water separated from the dough and the glutenin body, means for supplying water to the vessel, at least one mechanical mixing and kneading member operating in the vessel at variable operating speed, and means for shutting off said sieve means.

During mixing the water and flour and kneading the dough in accordance with the method of the invention, preferably on bakery scale according to the high effect principle (Chorleywood method), the kneading time may be very short and the standing time completely eliminated if about 40 – 50 joule/g. energy is used for the kneading. In this manner the time for producing the dough may be reduced from 32 minutes to less than 20 seconds. The washing time may be reduced from 6 minutes to about 2.5 – 3 minutes on washing constituents other than glutenin out of the dough in the same vessel immediately after the kneading process. Furthermore, according to the method of the invention excess water can be removed from the glutenin substance obtained by means of a centrifuge or whirler in less than 20 seconds, instead of about 1 minute which was previously required. A further advantage is that the stirring and kneading tools of the apparatus will be cleaned during the actual process in the above-mentioned mixing, kneading and washing vessel. The time required for determining the content of wet glutenin in the method according to the invention will be less than 3 – 4 minutes, including the intervals between the different phases and also including the time for weighing, as compared with more than 40 minutes previously required. The need for manual labor is reduced to less than one third in comparison with the known methods and means. All the stages of the method have been standardized.

In order to illustrate the invention one embodiment of the apparatus for carrying out the method according to the invention is shown in the accompanying drawings.

Figure 3:
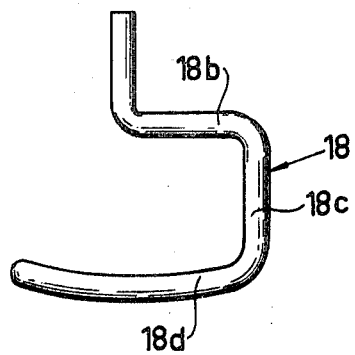
Figure 5:
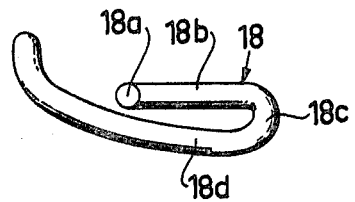

In the drawings,

FIG. 1 shows a side view of the apparatus, partially in vertical section along the line A — A in FIG. 2, FIG. 2 shows a front view of the same apparatus, partially in vertical section along the line B — B in FIG. 1, FIG. 3 illustrates a side view of a form of the mixing, kneading and processing tool or element included in the apparatus, FIG. 4 shows a side view of this element seen at an angle of 90° to FIG. 3, and FIG. 5 illustrates a top view of said element.

The apparatus comprises a frame or stand with a vertical support 2 projecting from a base 1, a driving motor 3 being pivotable by means of a supporting member 4 about pegs 5 and locked in the desired position.

An extension 6 at the top end of the shaft 3a of the motor 3 has square or noncircular cross section to drive a centrifuge 7. The center part of the centrifuge is driven by a vertical sleeve or hub 8 having square cross-section and fitting into the extension 6 of the shaft. Provided at the circumference of the centrifuge is a perforated cover, for example of filter cloth 9, which is loosely surrounded by a splash guard 10 having water drainage pipes 11. The splash guard 10 is secured to the casing of the motor 3 by means of supporting arms 12.

A mixing and kneading tool or element 18 is attached to a shaft 13. This element is intended to mix and knead the dough in a vessel 15 arranged for the purpose. A disc 14 is arranged on the lower part of the shaft 13 projecting into the vessel 15, to prevent the contents splashing out of the vessel. About its periphery the vessel 15 is provided with a support or attachment ring 16 which detachably can engage a corresponding groove in a support fork 19 applied on the support 2, so that the vessel is held in place during operation, but can be detached when required. At the bottom the vessel 15 has a sieve surface 17, for example in the form of a plane sifter cloth. On the lower side this sifter cloth 17 can be sealed against the passage of liquid by means of a sealing element 25, for example of rubber, applied on a slide 24 which is movable, for example displaceable in horizontal or vertical direction, or pivotably guided in a suitable holder which may, for example, consist of a funnel 20 serving to collect material passing through the sieve and may be provided with a suitable outlet 21. The slide 24 can be moved either manually or automatically either to a sealing position in which the sieve is closed to the passage of material through the seal 25 or to a free position in which the sieve is exposed to permit the material to pass through to the funnel 20.

The funnel 20 is carried by a holder 20a which in turn has a tendency to be urged upwardly by means of spring members 23 or the like, so that when the seal 25 is in position directly below the sieve 17, this is also pressed up against the sieve. The holder 20a can be moved downwardly against the spring action by means of a lever 22 which is pivotably journaled at the support 2 and the holder 20a. The lever 22 will be pressed down when it is desired to move the slide 24 to expose the sieve 17.

The shaft 13 and disc 14, respectively, are also connected to a mixing and kneading element 18 which may have U-shape or hooklike shape as shown in FIGS. 3 – 5, for example.

The shaft 13 also carries a pulley wheel 29 which by way of a cable, a belt or a rope, is driven by a pulley wheel 27 on the motor shaft. This cable, etc., is taughtened when the motor has been pivoted to a position in which the driving wheels 28, 32, 31 do not cooperate with each other. When the latter driving means is disconnected, therefore, the pulley wheel 29 comes into operation (for example at a speed of about 1,000 r.p.m.). The centrifuge 9 is driven directly by the shaft 3a of the motor 3 through the coupling 6, 8, for example at a speed of about 1,400 r.p.m.

The shaft 13 is journalled in a bearing bracket 26 and carries a friction or gear wheel 31 which is driven by an intermediate driving element 32 journalled at 33 which in its turn is driven by a driving wheel 28 for low speed (for example 200 –400 r.p.m.) connected to the motor 3. The shaft 13 also carries a pulley 29. Cooperation between the wheels 28, 32, 31 is achieved only when the motor 3 has been moved to a certain position about its pegs 5.

The disc 14 rotating together with the shaft 13 is intended to throw the dough mixture in the vessel 15 which is slung out against said disc 14, obliquely downwards back into the vessel, but it should at the same time allow rinsing water supplied from above through a vave-controlled supply conduit or hose, not shown, to pass into the vessel 15, since the dough is to be washed in this vessel, and it is therefore provided with suitable holes.

By means of an arm 30, which is vertically controlled by an upright 30a, the shaft 13 together with the parts 14, 18 attached thereto can be lifted upwardly and out of the vessel 15 when necessary.

A lever 35 journalled pivotably at 35a is connected pivotably at its end to a rod 34 to raise and lower the wheel 32. Thus, in the lowered position this wheel can be brought to engage the part 3a of the motor shaft which has a smaller diameter than the part 28, when the motor 3 is in a proper position. During this engagement the shaft 13 is driven at even lower speed, for example about 100 r.p.m.

When the glutenin content is to be determined, determined quantities of flour and water are first introduced into the vessel 15, possibly with the addition of chemical additives such as potassium bromate, potassium iodate, ascorbic acid, or the like (oxidants) to stabilize glutenin. The ingredients are mixed in said vessel by means of the element 18 at high speed (for example 1,000 r.p.m.). A dough is thus formed which is kneaded in the same vessel 15 with the filter cloth 17 shut off by means of the seal 25. The total time for this process at the same high speed need not amount to more than 20 –30 seconds. Subsequently, washing of the dough in the vessel 15 is effected with water which is allowed to run out through the filter cloth 17 and the outlet 21 of the funnel 30. The washing process is carried out, for example, at a speed of 400 r.p.m. for 2½–5 minutes, for example. Preferably the water should be supplied at a speed of about 0.5 –1 dl/sec., almost without pressure. The speed may be lowered to about 100 – 200 r.p.m. (transmission 3a, 32, 31) towards the end of the washing phase in order to collect together any dough remnants in the vessel 15.

The washed mixture consists of almost pure wet glutenin which, after being spun in the centrifuge, is weighed and provides a gauge of the suitability of the flour for baking purposes.

The arrangement of the device and its parts may deviate in many respects from that described and shown in the drawings. The part 13 and the centrifuge 9, for instance, may be driven by means of separate motors or by a common motor rotating about a horizontal shaft, the rotating movement of the motor shaft being transmitted to them by means of suitable transmission means. The bottom of the vessel 15 may also be provided with an open grid to protect the delicate filter cloth against the strain caused by the kneading. Furthermore, for example, the vessel 15 may rotate about the shaft 13 while the part 18 may be stationary. Even the shape and construction of the vessel 15 and the part 18 operating therein may vary considerably. They may also rotate in relation to each other in some other plane than the vertically one. Care should be taken, however, to ensure that no dough remnants escape from the vessel during the mixing and kneading phases and that the rinsing water is supplied to the vessel during the washing phase as it runs out from the vessel.

The centrifuge may consist of a counterweight attached to the upper extension of the motor shaft and having supporting arms and an extraction vessel suspended at the ends of the support arms from vertical position to a position perpendicular thereto. The extraction vessel can be removed by lifting. On its bottom there may be a water container separated by a rigid metal net. Furthermore, it is possible also to use the mixing, kneading and washing vessel as centrifuge.

Preferably, the mixing and kneading element 18 may be designed approximately as a U-shaped hook (FIGS. 3 –5) having a vertical peg part 18 continuing into an approximately horizontal part 18b, followed by an oblique, downwardly directed part 18c, terminating in a lower, slightly upwardly turned part 18d, somewhat bent in the direction of rotation, the extreme end of said part 18d being more definitely curved. The element 18 may also be shaped as a central shaft having projecting arms or pins of varying size. Different mixing members may be necessary for different types of flour.

What I claim is:

1. In a method for estimating the quality of flour intended for baking purposes, particularly of flour produced from wheat, the steps of mixing predetermined quantities of flour and water to a dough, kneading this dough, washing away water-soluble constituents from said dough with water, subsequently removing from the dough the water and substances dissolved and dispersed therein so as to obtain wet gluten or glutenin, providing the mixing, kneading and washing steps in immediate succession one after the other in one and the same vessel, while utilizing one and the same rotating kneading element therein, the constituents being mechanically mixed and kneaded during these steps at such a rotational speed of said kneading element that it will supply to said dough — by means of the mechanical engagement of said rotating kneading element with said dough — a sufficient amount of energy during the said mixing and kneading steps, said energy corresponding to a rotational speed of approximately 1,000 r.p.m. during a period of time not exceeding 20 to 30 seconds, with a view to effecting rapid ripening of said gluten or glutenin, and rotating said element during said washing step at a substantially lower rotational speed of approximately 100 to 200 r.p.m. during a period of time of approximately 2½ to 5 minutes to prevent the gluten or glutenin from being disintegrated during said washing steps, removing excess water from the gluten or glutenin and finally estimating the guantity of the dewatered gluten or glutenin thus obtained.

2. Method according to claim 12, wherein the dough is allowed to rest between the kneading and washing steps for a short period of time, shorter than 5 minutes.

3. Method according to claim 12, wherein chemicals which stabilize glutenin are added to the gluten or glutenin before or during the treatment in the vessel.

4. Method according to claim 12, wherein the water and the substances dissolved therein are removed from the vessel through a sieve surface, which is shut off during the mixing and kneading phases.

5. Method according to claim 12, wherein the treatment steps are carried out in a vertical vessel to the upper part of which the water is supplied and through the lower part of which the water is removed through an internal sifter, for example of filter cloth.

* * * * *

PO-1050
(5/69)

UNITED STATES PATENT OFFICE
CERTIFICATE OF CORRECTION

Patent No. 3,651,768     Dated March 28, 1972

Inventor(s) KALERVO ONNI HYPPÖLÄ

It is certified that error appears in the above-identified patent and that said Letters Patent are hereby corrected as shown below:

Column 3, line 41, "vave" should read --valve--

Claims: claims 2 - 5 should refer to claim 1

Signed and sealed this 11th day of July 1972.

(SEAL)
Attest:

EDWARD M. FLETCHER, JR.　　　　ROBERT GOTTSCHALK
Attesting Officer　　　　　　　　Commissioner of Patents